United States Patent
DeVaul et al.

(10) Patent No.: US 8,634,974 B2
(45) Date of Patent: Jan. 21, 2014

(54) USING PREDICTED MOVEMENT TO MAINTAIN OPTICAL-COMMUNICATION LOCK WITH NEARBY BALLOON

(75) Inventors: Richard Wayne DeVaul, Mountain View, CA (US); Eric Teller, San Francisco, CA (US); Clifford L. Biffle, Berkeley, CA (US); Josh Weaver, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/346,654

(22) Filed: Jan. 9, 2012

(65) Prior Publication Data

US 2013/0179008 A1    Jul. 11, 2013

(51) Int. Cl.
*G01C 23/00*  (2006.01)
*G05D 1/00*   (2006.01)
*G06F 7/00*   (2006.01)
*B64B 1/40*   (2006.01)
*F41J 9/08*   (2006.01)

(52) U.S. Cl.
USPC ................................. 701/3; 398/118; 244/31

(58) Field of Classification Search
USPC .......... 701/2, 3, 4, 5, 8, 302, 482; 244/31, 96, 244/97, 128; 398/118, 128, 129, 130, 131, 398/135, 138, 140, 212; 342/354
See application file for complete search history.

(56) References Cited

U.S. PATENT DOCUMENTS

| | | | |
|---|---|---|---|
| 2,790,479 A | 4/1957 | Mastenbrook | |
| 3,452,949 A | 7/1969 | Maloney et al. | |
| 4,366,936 A | 1/1983 | Ferguson | |
| 4,843,397 A * | 6/1989 | Galati et al. | 342/59 |
| 4,883,244 A * | 11/1989 | Challoner et al. | 244/171 |
| 4,987,607 A * | 1/1991 | Gilbreath et al. | 398/119 |
| 5,119,225 A | 6/1992 | Grant et al. | |
| 5,556,058 A * | 9/1996 | Bender | 244/171 |
| 6,324,398 B1 | 11/2001 | Lanzerotti et al. | |

(Continued)

FOREIGN PATENT DOCUMENTS

| | | |
|---|---|---|
| EP | 1172949 A1 | 1/2002 |
| JP | 2005094181 A | 4/2005 |
| WO | W001/59961 A1 | 8/2001 |

OTHER PUBLICATIONS

Joachim Horwath et al., Broadband Backhaul Communication for Stratospheric Platforms: The Stratospheric Optical Payload Experiment (STROPEX), Society of Photo-Optical Instrumentation Engineers (SPIE), 2006, vol. 6304.

(Continued)

*Primary Examiner* — Mary Cheung
*Assistant Examiner* — Rodney Butler
(74) *Attorney, Agent, or Firm* — McDonnell Boehnen Hulbert & Berghoff LLP

(57) ABSTRACT

A balloon may include an optical-communication component, which may have a pointing axis. A pointing mechanism could be configured to adjust the pointing axis. The optical-communication component could be operable to communicate with a correspondent balloon via a free-space optical link. For example, the optical-communication component could include an optical receiver, transmitter, or transceiver. A controller could be configured to determine a predicted relative location of the correspondent balloon. The controller may control the pointing mechanism to adjust the pointing axis of the optical-communication component based on the predicted relative location so as to maintain the free-space optical link with the correspondent balloon.

29 Claims, 7 Drawing Sheets

(56) References Cited

U.S. PATENT DOCUMENTS

| | | | |
|---|---|---|---|
| 6,513,758 | B1 | 2/2003 | Lloyd |
| 6,590,685 | B1 | 7/2003 | Mendenhall et al. |
| 6,628,941 | B2 | 9/2003 | Knoblach |
| 6,756,937 | B1* | 6/2004 | Chang et al. .................. 342/354 |
| 6,830,222 | B1 | 12/2004 | Nock et al. |
| 7,046,934 | B2 | 5/2006 | Badesha |
| 7,266,257 | B1* | 9/2007 | Chowdhury et al. ............. 385/1 |
| 7,356,390 | B2* | 4/2008 | Knoblach et al. ................. 701/4 |
| 7,567,779 | B2 | 7/2009 | Seligsohn et al. |
| 7,913,948 | B2 | 3/2011 | Porter |
| 7,948,426 | B2 | 5/2011 | Pevler |
| 8,061,648 | B2 | 11/2011 | Lachenmeier |
| 2002/0131123 | A1 | 9/2002 | Clark |
| 2002/0167702 | A1* | 11/2002 | Badesha et al. ............... 359/172 |
| 2004/0065773 | A1 | 4/2004 | Morales |
| 2005/0069325 | A1 | 3/2005 | Cicchiello et al. |
| 2005/0259991 | A1 | 11/2005 | Dudelzak et al. |
| 2006/0000945 | A1 | 1/2006 | Voss |
| 2007/0085735 | A1* | 4/2007 | Bay .......................... 342/357.02 |
| 2009/0324236 | A1 | 12/2009 | Wu et al. |
| 2010/0039984 | A1 | 2/2010 | Brownrigg |
| 2011/0118907 | A1* | 5/2011 | Elkins ............................... 701/3 |

OTHER PUBLICATIONS

Dirk Giggenbach et al., Optical Free-Space Communications Downlinks from Stratospheric Platforms—Overview on STROPEX, the Optical Communications Experiment of CAPANINA, 14th IST Mobile & Wireless Communications Summit, Jun. 2005, No. 483, Dresden, Germany.
Anthony S. Acampora et al., A Broadband Wireless Access Network Based on Mesh-Connected Free-Space Optical Links, IEEE Personal Communications, Oct. 1999, 1070-9916/99, 62-65.
J. Thornton et al., Broadband communications from a high-altitude platform: the European HeliNet programme, Electronics & Communication Engineering Journal, Jun. 2001, 138-144.
Jayasri Akella et al., Building Blocks for Mobile Free-Space-Optical Networks, IEEE, 2005, 0-7803-9019-9/05.
D. Grace et al., Capanina—Communications from Aerial Platform Networks Delivering Broadband Information for All, 14th IST Mobile & Wireless Communications Summit, Jun. 2005, No. 252, Dresden, Germany.
Mihael Mohorcic et al., Evaluation of Wavelength Requirements for Stratospheric Optical Transport Networks, Journal of Communications, Sep. 2009, vol. 4, No. 8, 588-596.
Carolina Fortuna et al., HAP based optical transport network design, Proceedings of the 15th International Electrotechnical and Computer Science Conference (ERK) Sep. 2006.
Alejandro Aragon-Zavala et al., High-Altitude Platforms for Wireless Communications, John Wiley & Sons, Ltd., 2008, pp. C1-80.
Alejandro Aragon-Zavala et al., High-Altitude Platforms for Wireless Communications, John Wiley & Sons, Ltd., 2008, pp. 81-158.
Alejandro Aragon-Zavala et al., High-Altitude Platforms for Wireless Communications, John Wiley & Sons, Ltd., 2008, pp. 159-241.
A. Biswas et al., Deep Space Optical Communications Link Availability and Data Volume, Free-Space Laser Communication Technologies XVI, San Jose, CA, Jan. 2004.
D. Giggenbach et al., Optical Data Downlinks from Earth Observation Platforms, Proceedings of the SPIE, 2009, vol. 7199.
David Grace et al., Integrating Users into the Wider Broadband Network via High Altitude Platforms, IEEE Wireless Communications, 1536-1286/05, Oct. 2005.
Jayasri Akella et al., Multi-channel Communication in Free-Space Optical Networks for the Last-mile, available online at: http://networks.ecse.rpi.edu/~sri/papers/Array-Ianman07.pdf (last visited Jan. 18, 2012).
Alan E. Willner et al., Physical Layer Routing in Free-Space Optical Networks, LEOS, available online at: http://photonicssociety.org/newsletters/oct05/physical_layer.html (last visited Jan. 18, 2012).
Justin Mullins, NASA Develops 'Smart' Weather Balloons for Launch Sites, NewScientist, May 23, 2007.
James Hutchinson, Mobile Mesh Network Finds Interest in NGOs, available online at: http://www.computerworld.com.au/article/374682/mobile_mesh_network_finds_interest_ngos/ (last visited Jan. 17, 2012).
Dung Dinh Luong, et al., Network Architecture and Protocols, CAPANINA, Oct. 16, 2006, pp. 1-83.
Dung Dinh Luong, et al., Network Architecture and Protocols, CAPANINA, Oct. 16, 2006, pp. 84-172.
In Keun Son, Design and Optimization of Free Space Optical Networks, Auburn University, Dec. 13, 2010, pp. 1-78, Auburn, Alabama.
In Keun Son, Design and Optimization of Free Space Optical Networks, Auburn University, Dec. 13, 2010, pp. 79-147, Auburn, Alabama.
Hui Zang, et al., A Review of Routing and Wavelength Assignment Approaches for Wavelength-Routed Optical WDM Networks, Optical Networks Magazine, Jan. 2000, pp. 47-60.
Scott Bloom, et al., The Last-Mile Solution: Hybrid FSO Radio, AirFiber, Inc., May 2002, pp. 1-20.
Di Wang, et al., Throughput Capacity of Hybrid Radio-Frequency and Free-Space-Optical (RF/FSO) Multi-Hop Networks, Department of Electrical, Computer and Systems Engineering, Rensselaer Polytechnic Institute, pp. 1-8.
Mohammed N. Smadi, et al., Free-Space Optical Gateway Placement in Hybrid Wireless Mesh Networks, Journal of Lightwave Technology, Jul. 15, 2009, vol. 27, No. 14, pp. 2688-2697.
Roy Eddleston, et al., Mesh Networking Soars to New Heights, available online at: http://www.airballooningevent.com/mesh-networking-soars-to-new-heights (last visited Jan. 18, 2012).
Barry William Walsh, Balloon Network Test Successful, available online at: http://17.taylor.edu/community/news/news_detail.shtml?inode=14221 (last visited Jan. 18, 2012).
T.C. Tozer et al., High-altitude platforms for wireless communications, Electronics & Communication Engineering Journal, Jun. 2001, 127-137.
G. Ellinas, et al., Network Control and Management Challenges in Opaque Networks Utilizing Transparent Optical Switches, available online at: http://www.jaywalkertc.com/publications/JAW_live_papers/IEEE_Opt_Comm.pdf (last visited Jan. 18, 2012).
Asuman E. Ozdaglar, et al., Routing and Wavelength Assignment in Optical Networks, available online at: http://web.mit.edu/asuman/www/documents/RWA_Paper.pdf (last visited Jan. 18, 2012).
David Grace et al., Broadband Communications via High Altitude Platforms, John Wiley & Sons, Ltd., 2011, pp. 49-73.
David Grace et al., Broadband Communications via High Altitude Platforms, John Wiley & Sons, Ltd., 2011, pp. 75-113.
David Grace et al., Broadband Communications via High Altitude Platforms, John Wiley & Sons, Ltd., 2011, pp. 219-238.
Balaram et al., Autonomous Mobility, Navigation and Control for Venus Aerobots, International Symposium on Artificial Intelligence, Optics and Automation in Space, Jul. 14, 1997, Tokyo, Japan.
Andrew S. Carten Jr., An Investigation of the Applicability of High Altitude, Lighter-Than-Air (LTA) Vehicles to the Tactical Communications Relay Problem, Air Force Cambridge Research Labs, Hanscom Air Force Base, Aug. 20, 1974, Massachusetts.
Michael Corbett et al., High Altitude Balloon Project, Wright State University, Engineering Design, Mar. 11, 2006, Dayton, Ohio.
PCT International Search Report and Written Opinion, PCT International Application No. PCT/US2013/020538 dated Apr. 22, 2013.

* cited by examiner

USING PREDICTED MOVEMENT TO MAINTAIN OPTICAL-COMMUNICATION LOCK WITH NEARBY BALLOON

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In a first aspect, a balloon is provided. The balloon includes an optical-communication component. The optical-communication component has one or more pointing axes. The optical-communication component is operable to communicate with a correspondent balloon via a free-space optical link. The optical-communication component also includes a pointing mechanism configured to adjust the pointing axis. The optical-communication component further includes a controller. The controller is configured to determine a predicted relative location of the correspondent balloon and control the pointing mechanism to adjust the pointing axis based on the predicted relative location, to maintain the free-space optical link with the correspondent balloon.

In a second aspect, a method is provided. The method includes determining a location of a first balloon. The first balloon includes an optical-communication component that is configured to communicate with a second balloon via a free-space optical link. The method additionally includes determining a predicted location of the second balloon relative to the location of the first balloon based on a last known location and a last-known motion vector of the second balloon. The method also includes controlling a pointing mechanism to adjust a pointing axis of the optical-communication component in the first balloon based on the predicted location, to maintain the free-space optical link with the second balloon.

In a third aspect, a non-transitory computer readable medium having stored instructions is provided. The instructions are executable by a computing device to cause the computing device to perform functions. The functions include: (i) determining a location of a first balloon. The first balloon includes an optical-communication component that is configured to communicate with a second balloon via a free-space optical link. The functions further include: (ii) determining a predicted location of the second balloon relative to the location of the first balloon based on a last known location and a last known motion vector of the second balloon and (iii) controlling a pointing mechanism to adjust a pointing axis of the optical-communication component in the first balloon based on the predicted location, to maintain the free-space optical link with the second balloon.

These as well as other aspects, advantages, and alternatives, will become apparent to those of ordinary skill in the art by reading the following detailed description, with reference where appropriate to the accompanying drawings.

DETAILED DESCRIPTION

Figure 1:
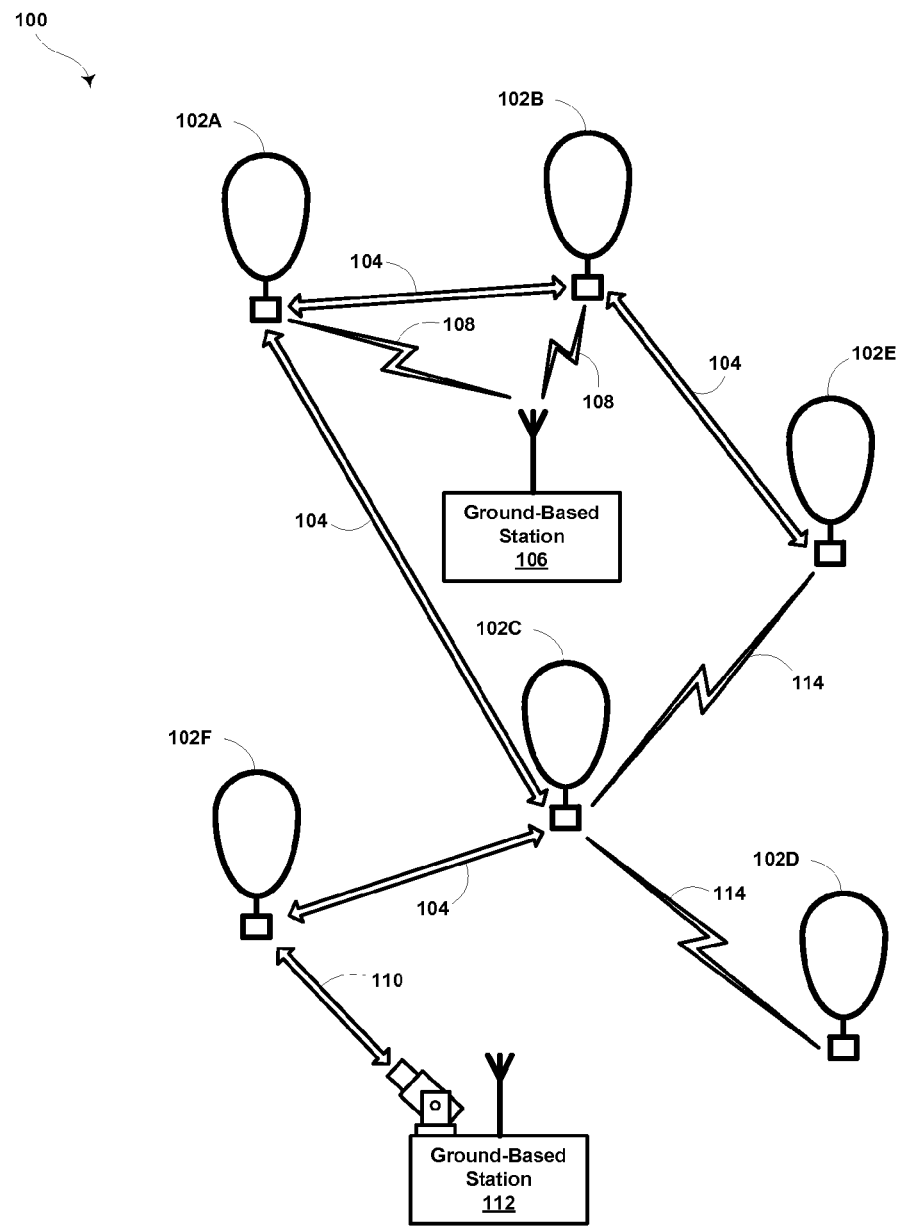
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

The present disclosure describes various example embodiments of apparatuses, methods, and functions executable by a computer-readable medium that are generally operable to maintain an optical communications link between a first balloon and a second balloon based on a predicted location of the second balloon relative to the first balloon.

In one example embodiment, a balloon includes an optical-communication component with a pointing axis. The optical-communication component could include an optical receiver, an optical transmitter, and/or an optical transceiver. The pointing axis can be adjusted in order to maintain a free-space optical link with a correspondent balloon.

For example, the balloon could include a pointing mechanism configured to adjust the pointing axis of the optical-communication component. Additionally, the balloon could include a controller. The controller could be configured to determine a predicted relative location of the correspondent balloon. The predicted relative location of the correspondent balloon could be determined using a Kalman filter method or other similar algorithms for doing inference and prediction in a dynamic system. Furthermore, the controller may control the pointing mechanism to adjust the pointing axis based on the predicted relative location so as to maintain the free-space optical link with the correspondent balloon.

2. Example Balloon Networks

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
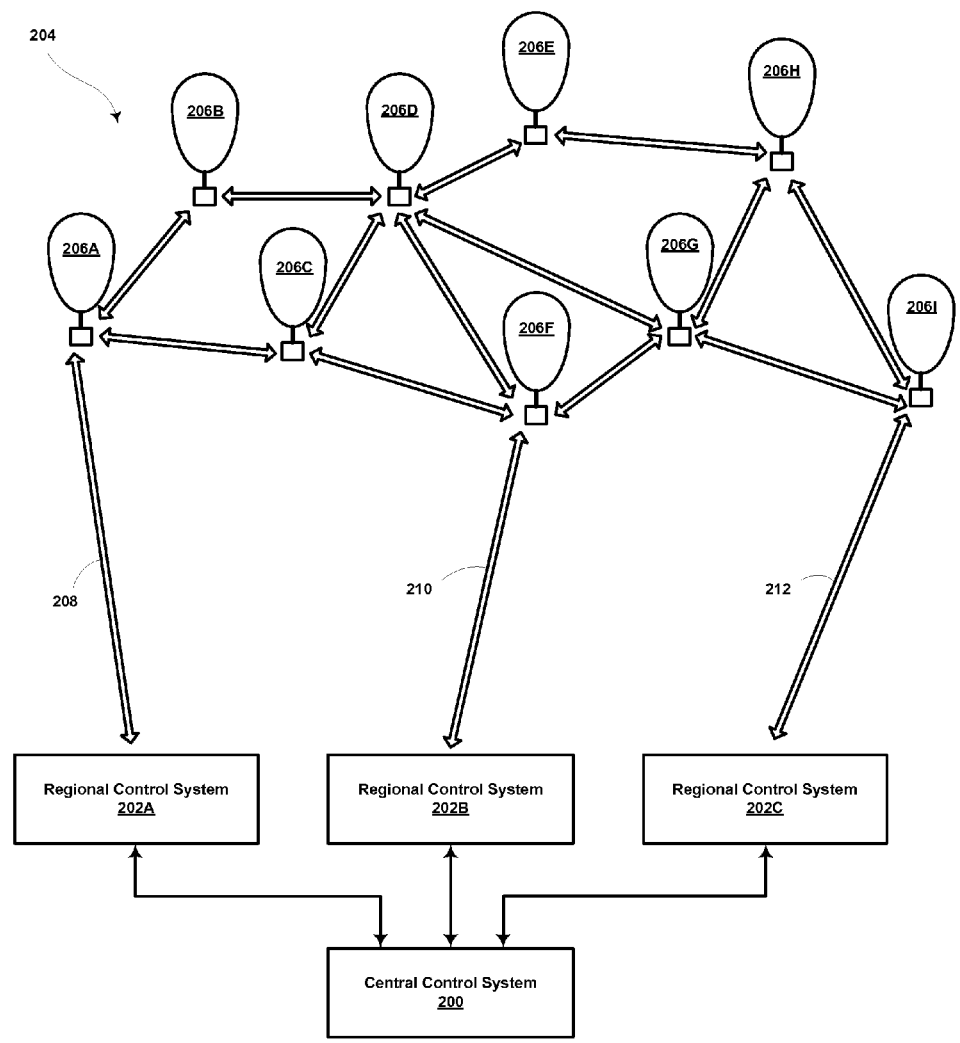
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
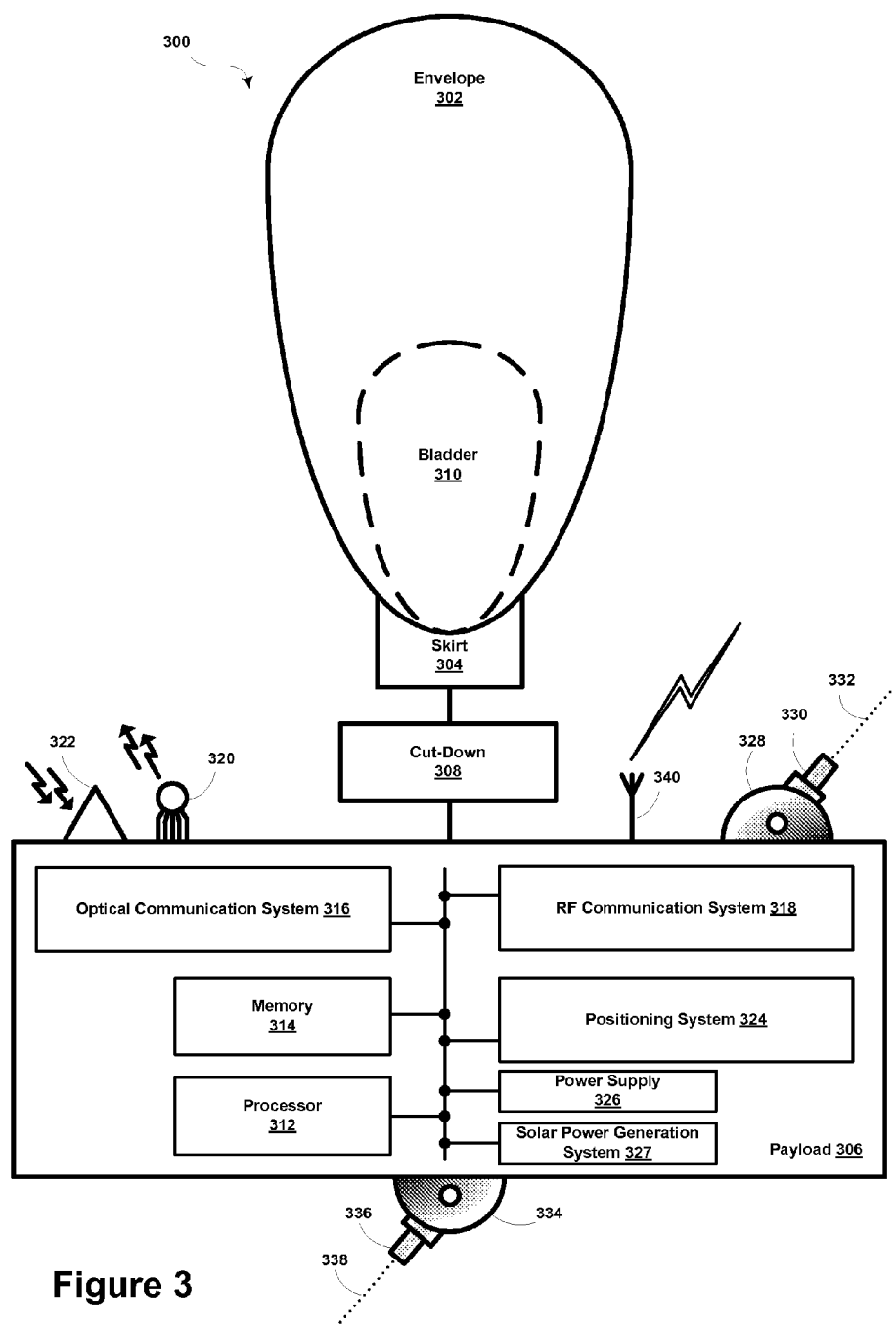
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
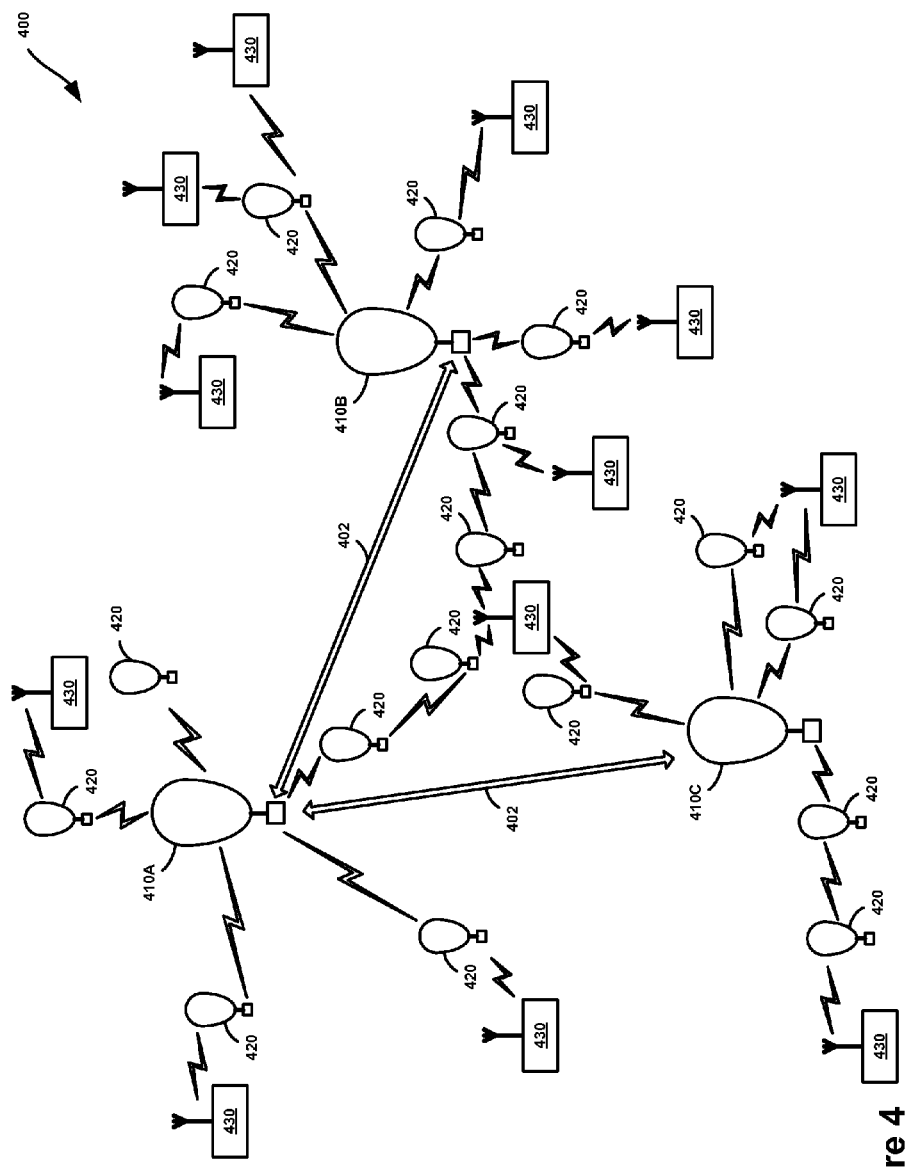
FIG. 4 shows a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 Mbit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. A Balloon with an Optical-Communication Component Having a Pointing Axis Adjustable Based on a Predicted Relative Location of a Correspondent Balloon.

A balloon (e.g., a first balloon) may be configured to communicate with a correspondent balloon (e.g., a second balloon), for example to maintain an optical-communications link between the balloons. The two balloons could be similar, or the two balloons could be dissimilar (e.g., different types of nodes in a heterogeneous balloon network). In some embodiments, an optical-communications link may be additionally established between the balloon to a ground-based station and/or a space-based platform (e.g., a satellite).

Figure 5:
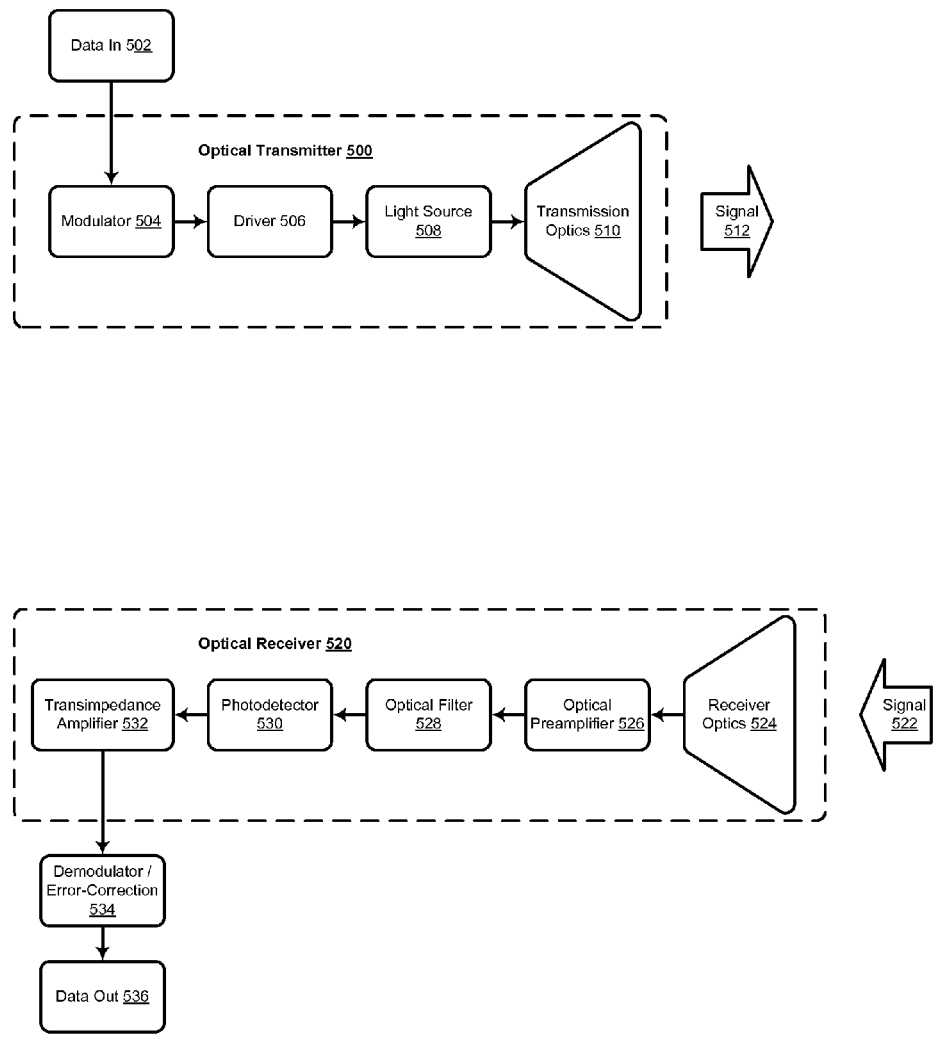
FIG. 5 is a simplified block diagram illustrating an optical transmitter and an optical receiver, according to an example embodiment.

The balloon could include one or more optical-communication components, such as an optical transmitter, an optical receiver, and/or an optical transceiver. Accordingly, some example embodiments could be described in reference to FIG. 3 and FIG. 5. FIG. 5 is a simplified block diagram illustrating an optical transmitter 500 and an optical receiver 520, according to an example embodiment.

In such an example embodiment, an optical transmitter 500 could receive data in 502 that could be in the form of electrical and/or optical signals. The electrical and/or optical signals that comprise the data in 502 may include information in the form of one or more digital or analog voltage and/or optical intensity level(s). The data in 502 could be received by the optical transmitter 500 via an electrical (e.g., wire or multi-conductor cable) or optical (e.g., optical fiber or waveguide) connection. Modulator 504 could encode the information from the data in 502 using one or more encoding techniques, such as intensity modulation, phase modulation, pulse-wave modulation, and/or frequency modulation. Those skilled in the art will understand that modulator 504 could reasonably use other known encoding schemes.

A driver 506 may convert the encoded information into a driving signal that could act to illuminate a light source 508. In an example embodiment, light source 508 could represent one or more light-emitting diodes (LED) or lasers. The light source 508 could also include other high-power light sources known in the art. The emission wavelengths of light source 508 could be in the ultraviolet, visible, infrared and microwave spectral regimes. The wavelength band of emission could be relatively narrow (e.g., a few nanometers in spectral width). Alternatively, the wavelength band could be broadband (e.g., a large portion of visible spectrum, as is common in 'white' LED emission). Further, light source 508 could be configured to emit light at multiple discrete wavelengths (e.g., with a two-color laser) or within multiple wavebands (e.g., with a multi-color LED).

The light source 508 could be configured to modulate (e.g., turn on and off) at high frequencies in order to achieve more than 10 gigabit-per-second (GBit/s) data throughput. Light emitted from light source 508 could be either collimated or uncollimated. Further, the intensity of the emitted light could be adjustable. The emitted light could be collimated and/or focused by transmission optics 510. The transmission optics 510 could include elements such as a telescope and/or a beam expander. Depending upon the embodiment, other optical elements could be included in the transmission optics 510, such as those known in the art that may be used for long-range imaging.

In an alternative embodiment, light emitted from the light source 508 could be modulated by a modulator. For instance, a polarization modulator could be configured to modulate the polarization of the light emitted from light source 508. In such a scenario, the free-space optical signal could include data based, at least in part, on the polarization of light. Various modulator types are possible, including a liquid-crystal modulator and a spatial light modulator, among others. In practice, the free-space optical signal could include more than one type of light modulation. Further, the light modulation could be performed at high frequencies to achieve more than 10 GBit/s data transmission.

Depending upon the embodiment, the elements of the transmission optics 510 could be configured in different ways in an effort to efficiently transmit output light as a free-space optical signal, such as signal 512, to a correspondent balloon. For instance, the transmission optics 510 could be configured to provide an optical-communications link over several kilometers. In other embodiments, the transmission optics 510 could be configured differently in order to establish an optical-communications link with a ground-based station or a space-based platform. For instance, the configuration of optical components in the transmission optics 510 could be different if the intended target was a ground-based station (15-30 km away) compared to if the intended target was a space-based platform (geosynchronous orbits can be over 42,000 km). Therefore, the distance between the balloon and a space-based target could be over 42,000 km away. Accordingly, the optical components in the transmission optics 510 could be adjusted (e.g., by using a zoom and/or focusing feature on the telescope). In other embodiments, separate sets of transmission optics 510 could be used based upon, for instance, the intended target distance and target altitude.

An optical receiver 520 could be configured to receive a signal 522 that could represent part of an optical-communications link. The signal 522 could be a free-space optical signal with encoded information from a correspondent balloon or another airborne platform. The signal 522 could also originate from a ground-based station or a space-based platform (e.g., a satellite or other space-craft).

Signal 522 could be optically collected by receiver optics 524. Receiver optics 524 could include a telescope or any combination of optics (such as refractive lenses and reflective mirrors) known in the art for receiving free-space optical signals at long distances (e.g., more than several kilometers). Light received by the receiver optics 524 could be amplified using an optical preamplifier 526. The optical preamplifier 526 could include one or more of a doped fiber amplifier, semiconductor optical amplifier (SOA), Raman amplifier, and/or a parametric amplifier. Other optical amplifier types are possible within the context of this disclosure.

The amplified optical signal could be filtered by an optical filter 528. In some embodiments, the optical filter could include an absorptive filter, an interference filter, and/or a dichroic filter. The optical signal could be filtered in various ways, for instance based upon wavelength (e.g., in a bandpass filter) and/or polarization (e.g., with a polarizer or waveplate).

The filtered light could be detected by a photodetector 530. The photodetector 530 could include one or more photodiodes, charge-coupled devices (CCD), photoconductors, or other means for photon-sensing known in the art. The photodetector 530 could include a multiple element detector system configured to detect changes in an optical beam location. In an example embodiment, the photodetector could transduce incident light into a photocurrent signal. The photocurrent signal could then be amplified with a transimpedance amplifier 532. The transimpedance amplifier 532 may be configured to convert the photocurrent signal into a voltage and provide signal gain. Other amplifier types are possible, and could be dependent, for instance, upon the output type of the photodetector. For instance, if the photodetector 530 is a photoconductive device that produces a photovoltage, a tranconductance amplifier could be used to convert the photovoltage to a signal current. Those skilled in the art will understand that there are many other ways to convert a photosignal into an electrical signal, and those other ways are contemplated herein.

The optical receiver could also include a demodulator/error-correction element 534, which may be configured to extract information from the signal 522. The type of demodulation utilized by the demodulator/error-correction element 534 may depend upon the type of modulation initially performed on the optical signal. For instance, the demodulation method may include carrier recovery, clock recovery, frame synchronization, pulse compression, error detection and correction, and/or mixing with a local oscillator (e.g., heterodyne detection). Other demodulation methods known in the field of optical and digital signal processing are possible.

The demodulator/error-correction element 534 could be further configured to detect and correct errors in the as-received signal. For instance, the element 534 could include a hash function, a checksum algorithm, and/or other redundancy check algorithms in an effort to reduce data transmission errors. Further, error-correcting codes (ECCs) (e.g., Turbo or low-density parity-check codes) could be implemented in the demodulator/error-correction element 534 to detect and correct errors. If errors are found, the optical receiver 520 could be configured to correct the error automatically with a forward error correction (FEC) algorithm. Alternatively, the optical receiver 520 could be configured to send an automatic repeat request (ARQ) to the transmitting node via a reverse channel in an effort to get a new transmission of the data.

In reference to FIG. 3, the optical-communication component(s) 330, such as optical transmitter 500 and/or optical receiver 520, could be mechanically and/or optically coupled to a gimbal mount 328. The gimbal mount 328 could be configured to adjustably point in a pointing direction 332. Second optical-communication component(s) 336 could be mechanically and/or optically coupled to a gimbal mount 334 and oriented along a pointing direction 338. The second optical-communication component(s) 336 could represent multiple components configured to maintain optical communication links with multiple nodes and/or nodes at varying altitudes. For instance, optical-communication component 330 could be configured to maintain an optical link with a neighboring balloon while optical-communication component 336 could be configured to maintain an optical link with a ground-based station. In other words, one or more optical-communication components could be used with respective pointing mechanisms in an effort to maintain optical links with one or more ground-, air-, or space-based network nodes. Within the context of this disclosure, the optical-communication components 330 and 336 may include an optical transmitter, an optical receiver, and/or an optical transceiver.

Figure 6:
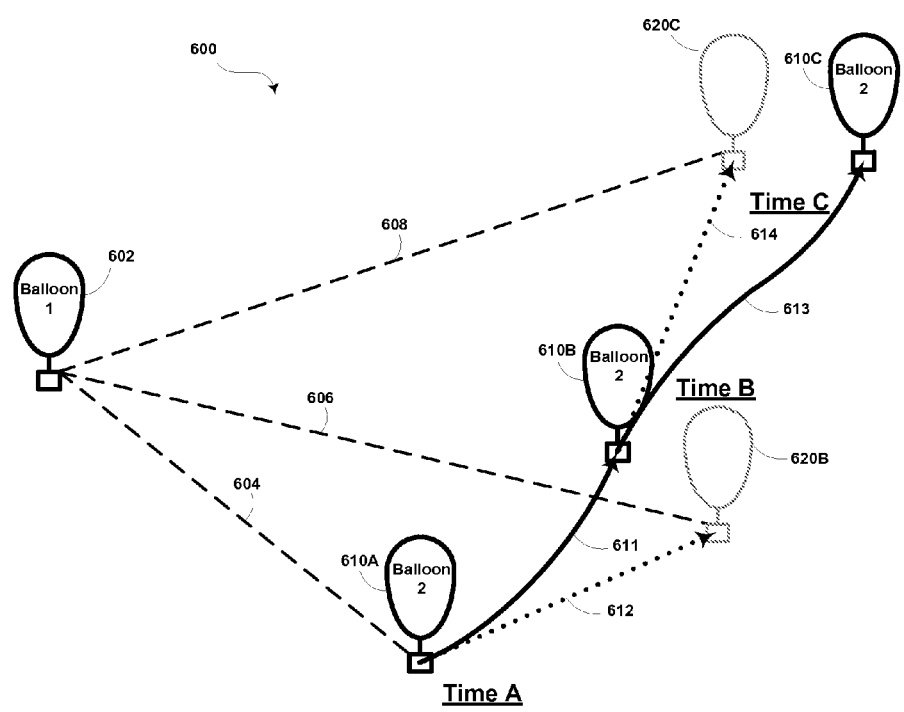
FIG. 6 shows a balloon communication scenario, according to an example embodiment.

FIG. 6 shows an example scenario 600 for maintaining a free-space optical communication link between balloons. In this example, a balloon 602 attempts to maintain a free-space optical link with a correspondent balloon (depicted in FIG. 6 as Balloon 2). Each of the correspondent balloon locations 610A-C could represent the location of an example correspondent balloon at time A, B, and C. The balloon 602 may have a pointing mechanism, such as gimbal mount 328. The pointing mechanism could adjust a pointing axis of an optical-communication component. The optical-communication component could be an optical receiver, an optical transmitter, and/or an optical transceiver.

The balloon 602 could further include a controller. The controller could be any combination of positioning systems, computers, and memory. Other configurations of the controller are possible. The controller could be configured to determine a predicted location of the correspondent balloon at time B and subsequently at time C, which could be represented by predicted balloon locations 620B and 620C, respectively. The controller could determine the predicted location in various ways.

In one example embodiment, the controller could acquire a first location, which could be the location of the balloon itself. Although balloon 602 is illustrated as at one location, it is understood that within the context of the disclosure that the balloon 602 could also move and all other locations and motion vectors could be determined with respect to the instantaneous location and velocity of balloon 602.

The controller could also acquire a last-known location of the correspondent balloon and optionally, a last-known motion vector of the correspondent balloon. The last-known location of the correspondent balloon could include GPS and/or inertial navigation system information about a location of the correspondent balloon at a specific time. For instance, correspondent balloon location 610A could represent the location (e.g., longitude, latitude, and altitude) of the correspondent balloon at time A. Correspondent balloon location 610B could represent the location of the correspondent balloon at time B, and so on.

The last-known motion vector of the correspondent balloon could include, for instance, the direction, velocity, and/or acceleration of the correspondent balloon at a given time. For example, motion vectors 612 and 614 could represent the direction, velocity, and/or acceleration of the correspondent balloons at time A and time B, respectively.

The last-known location and, optionally, the last known motion vector of the correspondent balloon could be acquired via a RF link or other communication link. For instance, a correspondent balloon at location 610A could transmit its last known location (e.g., GPS coordinates and/or inertial navigation data) to the balloon 602 at time A. Further, a motion vector 612 could represent velocity, heading, and/or acceleration data from the correspondent balloon.

The controller could use the last-known location and, optionally, the last-known motion vector as inputs to a Kalman filter that could output a predicted relative location of the correspondent balloon. Kalman filters are described in further detail below. The predicted relative location determination could take into account, for instance, the relative latitude/longitude of the respective balloons (602 and 610A-C), as well as their respective altitudes. Actual paths 611 and 613 could represent the actual path of the balloon from time A through time C. The actual correspondent balloon location and the predicted relative location are depicted as visibly separated in FIG. 6 for visual and descriptive clarity only. In one embodiment, the Kalman method could be performed many times per second. Thus, in practice, the actual and predicted locations of the correspondent balloon may be sufficiently close so as to maintain the free-space optical link throughout scenario 600.

The controller may control the pointing mechanism to adjust the pointing axis based on the predicted relative location. For instance, the controller could adjust the pointing direction 332 on the gimbal mount 328 (located on the first balloon) to move from an initial axis 604 towards a first predicted target axis 606 in an effort to track the correspondent balloon and to maintain the free-space optical communication link between the respective balloons.

At time B, the process could be repeated by the controller. For example, the controller could receive the GPS coordinates of the correspondent balloon at location 610B. Further, the controller could receive other sensor data that may suggest a motion vector 614. The combination of these data could produce a subsequent predicted relative location 620C of the correspondent balloon at time C, which may differ from the actual position of the correspondent balloon 610C at time C. Accordingly, the controller could control the pointing direction 332 on the gimbal mount 328 to move from the first predicted target axis 606 to a second predicted target axis 608 so as to maintain the free-space optical link between the respective balloons.

In one embodiment, the optical-communication component may be an optical receiver. In such a case, the pointing mechanism could be controlled by the controller to adjust the pointing axis of the optical receiver towards a predicted target axis in an effort to maintain an optical communications link. Further to maintain the communications link, the output of the optical receiver may be monitored to detect the free-space optical signal from the correspondent balloon 610A-C. In one example embodiment, a multi-element detector system (e.g., a quadrature detector) could be used to optimize the pointing axis of the pointing mechanism. For instance, a beam misalignment condition may be determined if one of the detector elements of the multi-element detector system receives more signal than the others. In such a case, the pointing axis could be controlled by the controller to equalize the output from each of the detector elements in an effort to realign the transmitted beam with the detector system. Alternatively or additionally, the pointing axis could be controlled to maximize the overall output signal from the detector system. Additionally, the output signal from the detector signal could be used as an input to the aforementioned Kalman filter method.

In another embodiment, the optical-communication component on the first balloon could be an optical transmitter. As described above, the pointing mechanism could be controlled by the controller to adjust the pointing axis of the optical transmitter towards a predicted target axis in an effort to maintain an optical communications link. The correspondent balloon 610A-C could transmit information to the first balloon via a reverse channel. The transmitted information could include the GPS location and/or inertial guidance data of the correspondent balloon. The transmitted information could also represent beam positioning information. For instance, the correspondent balloon could include a multi-element detector system operable to optimize optical beam alignment. Output from the multi-element detector could be transmitted to the first balloon and used as input to the Kalman filter or other sensor fusion algorithm. A reverse channel could be represented by any means with which the correspondent balloon 610A-C could signal the balloon 602, (e.g., an RF signal, an optical signal, or an indirect link through a ground-based station). Upon receiving the transmitted information from the correspondent balloon 610A-C and determining a new predicted relative location of the correspondent balloon, the controller could control the pointing axis of the optical transmitter so as to maintain the free-space optical link.

In further embodiments, a reverse channel may not be necessary to maintain the free-space optical link. For instance, a camera on the balloon 602 may provide images that could be used as feedback during the balloon-tracking process. As such, the controller may control the pointing mechanism to adjust the pointing axis such that the correspondent balloon 610A-C is centered within the images. Thus, a free-space optical link may be sufficiently maintained if the correspondent balloon 610A-C is centered within such images.

In yet another embodiment, the optical-communication component could include an optical transceiver. The optical transceiver may represent an optical receiver and an optical transmitter having a shared pointing axis. The optical transceiver could thus be configured to send and receive optical signals along the shared pointing axis. As described above, the pointing mechanism could be controlled by the controller to adjust the pointing axis of the optical transceiver in an effort to maintain an optical communications link. In such an example embodiment, the optical transceiver could i) receive data from the correspondent balloon, ii) transmit data to the correspondent balloon, or both. Accordingly, upon receiving location data about the correspondent balloon direction via the free-space optical link and/or another reverse channel, a Kalman filter method could be used to determine a predicted relative location of the second balloon. The pointing axis could be adjusted so as to point at the predicted relative location of the second balloon and thus maintain the optical communication link.

Figure 7:
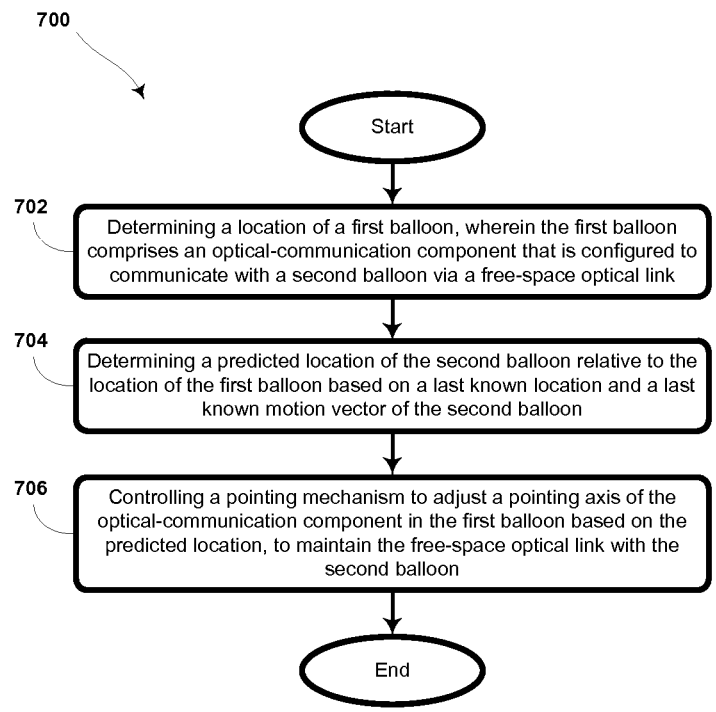
FIG. 7 is a method, according to an example embodiment.

5. Method for Controlling a Pointing Mechanism to Adjust a Pointing Axis of an Optical-Communication Component in a First Balloon Based on a Predicted Location of a Second Balloon A method 700 is provided for pointing an optical-communication component attached to a first balloon towards a second balloon based on a predicted location of the second balloon relative to the first balloon. The method could be performed using any of the apparatus shown in FIGS. 1-6 and described above. However, other configurations could be used. FIG. 7 illustrates the steps in an example method with reference to FIG. 6, however, it is understood that in other embodiments, the steps may appear in different order and steps could be added or subtracted.

Step 702 includes determining a location of a first balloon 602. The first balloon 602 may include an optical-communications component configured to communicate with a second balloon (610A-C) via a free-space optical link.

Step 704 includes determining a predicted location 620B&C of a second balloon relative to the location of the first balloon 602. The predicted location 620B&C could be based on a last known location and a last known motion vector of the second balloon 610A-C. The predicted location 620B&C could be determined, in one example embodiment, using a Kalman filter method. The Kalman filter method could use as inputs various sensor data (e.g., GPS data, inertial navigation data, camera images, etc.) so as to determine the predicted locations.

The Kalman filter may include an algorithm that incorporates the sensor data with a physical model of the balloon and its environment, which could include neighboring balloons. The algorithm could determine the previous state of the system and incorporate the previous state with current state sensor data to predict a current state of the system. The system state predictions from the Kalman filter method may typically be more accurate than, for instance, utilizing data from only one sensor (e.g., predicting a current balloon position by extrapolating balloon GPS data).

In the example embodiment involving the Kalman filter method, the second balloon could have an on-board GPS receiver. The GPS receiver could provide an estimate of the second balloon's position. However, the GPS estimate of the second balloon's position may include noise, jitter, and generally imperfect location data. The second balloon may transmit the GPS coordinates as well as sensor measurements from other sources, such as an accelerometer, gyroscope, and/or other sensors, to the first balloon. Upon receiving at least a portion of the GPS data and other sensor measurements, the Kalman filter method could be carried out in a recurring cycle. The cycle could repeat multiple times per second or at a different rate. The cycle could alternatively or additionally be triggered by an external event, for instance by the first balloon establishing an optical communication link with the second balloon. Other triggers are possible. The Kalman filter cycle could involve two main phases (e.g., a prediction phase and an update phase).

In the prediction phase, the first balloon could predict the second balloon's current position using the physical model of the second balloon and its environment plus any perturbations to other system variables, for instance, wind velocity, heading, and acceleration. Additionally, a covariance (a measure of how much two random variables, such as wind velocity and balloon position, change together) related to the predicted position could be calculated. For instance, the covariance could be proportional to the speed of the second balloon.

In the update phase, the first balloon could receive GPS positioning data relating the position of the second balloon. The positioning data could be used to update the initial predicted position to obtain an updated position.

The predicted and updated positions could be used as inputs and weighted based on their associated covariances. The output of the Kalman filter method could provide a predicted relative location of the second balloon. The predicted relative location of the second balloon could be thus used to adjust the pointing angle of the optical-communication device so as to maintain a free-space optical link between the first balloon and the second balloon.

As described above, the Kalman filter method could be performed in the first balloon by a computing system that could include a computer-readable medium, a processor, and a memory. Furthermore, the Kalman filter method could be performed in both the first and the second balloons in an effort to correct the alignment of the respective optical-communication components operable in the free-space optical link. In yet another embodiment, one of the communicating balloons could perform the method on behalf of both balloons, control its on-board optical-communication component as well as transmit a control command to the other balloon in order to remotely adjust the other balloon's optical-communication component.

Alternatively, the Kalman filter method could be carried out in part or wholly by a computing system located on another air-, ground-, or space-based platform. For example, the predicted location of the second balloon could be determined by a super-node balloon in the balloon network. The method could also be carried out by a distributed network of processors, such as a server network.

It will be understood to those skilled in the art that various other embodiments involving different sensor and data fusion algorithms are possible in determining a predicted location and those other embodiments are contemplated herein. For instance, other linear quadratic estimation (LQE) and/or dynamic positioning algorithms known in the art of control theory may be reasonably applied within the context of this disclosure.

Step 706 includes controlling a pointing mechanism to adjust a pointing axis of an optical-communication component in the first balloon 602 based on the predicted location 620B & 620C. The optical-communication component in the first balloon 602 is operable to communicate with the second balloon 610A-C via a free-space optical link, and may include an optical receiver, an optical transmitter, and/or an optical transceiver.

With reference to FIG. 3, the gimbal mount 328, which may also be termed the pointing mechanism, could be controlled to point the optical-communication component 330 towards a predicted target axis 606 & 608.

The controlling of the pointing mechanism could be performed by the first balloon, for instance using processor 312 and memory 314 to control the gimbal mount 328. Alternatively, the pointing mechanism could be controlled remotely by another balloon or ground- or space-based station.

Once under local or remote control, the pointing mechanism could be adjusted to point along the predicted target axis 606 & 608. In other words, adjustments could be performed with an effort to maintain a free-space optical link between the first and the second balloon. In one embodiment, if the optical-communication component is an optical receiver, the pointing mechanism may be adjusted so that the optical receiver is moved to the predicted target axis 606 & 608. The pointing mechanism may also adjust the pointing axis continuously so as to track a moving target axis (e.g., due to a moving balloon). The rate and/or amount of pointing axis adjustment could be based on the rate of change of the predicted target axis. Other techniques known in the art to maintain a line-of-sight optical link may be reasonably used within the context of the disclosure.

6. A Non-Transitory Computer Readable Medium with Instructions to Control a Pointing Mechanism to Adjust a Pointing Axis of an Optical-Communication Component in a First Balloon Based on a Predicted Location of a Second Balloon Some or all of the functions described above and illustrated in FIGS. 3, 5, 6, and 7 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device, such as the processor 312 illustrated in FIG. 3. Alternatively, the computing device that executes the stored instructions could be another computing device, such as a server in a server network, or a ground-based station.

The non-transitory computer readable medium may store instructions executable by the processor 312 to perform various functions. The functions could include the determination of a location of a first balloon. The first balloon could include an optical-communication component that is configured to communicate with a second balloon via a free-space optical link. The functions could further include determining a predicted location of the second balloon relative to the location of the first balloon. The determination of the predicted location could be based on a last-known location and a last-known motion vector of the second balloon.

The determination of the predicted location could use various sensor fusion algorithms, including, but not limited to a Kalman filter method. Other algorithms are possible.

The non-transitory computer readable medium may include further functions such as controlling a pointing mechanism to adjust a pointing axis of an optical-communication component in the first balloon based on the predicted location to maintain a free-space optical link with the second balloon.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A balloon, comprising:
an optical-communication component having a pointing axis, wherein the optical-communication component comprises an optical receiver configured to receive free-space optical signals along the pointing axis, wherein the optical-communication component is operable to communicate with a correspondent balloon via a free-space optical link, and wherein the optical receiver comprises a multiple element detector system configured to detect changes in an optical beam location;
a pointing mechanism configured to adjust the pointing axis;
a controller, wherein the controller is configured to determine a predicted relative location of the correspondent balloon and control the pointing mechanism to adjust the pointing axis based on the predicted relative location, to maintain the free-space optical link with the correspondent balloon.

2. The balloon of claim 1, wherein the balloon is a high-altitude balloon in a high-altitude balloon mesh network.

3. The balloon of claim 1, wherein the optical receiver comprises a photodiode.

4. The balloon of claim 1, wherein the controller is configured to determine the predicted relative location of the correspondent balloon based on free-space optical signals from the correspondent balloon received by the optical receiver.

5. The balloon of claim 1, wherein the optical-communication component further comprises an optical transmitter configured to transmit free-space optical signals along the pointing axis.

6. The balloon of claim 1, wherein the optical transmitter comprises a light-emitting diode.

7. The balloon of claim 1, wherein the optical transmitter comprises a laser.

8. The balloon of claim 1, wherein the optical transmitter comprises a modulator, wherein the modulator is configured to modulate light to form the free-space optical signals.

9. The balloon of claim 8, wherein the modulator comprises a spatial light modulator.

10. The balloon of claim 8, wherein the modulator comprises a polarization modulator.

11. The balloon of claim 8, wherein the modulator comprises a liquid-crystal modulator.

12. The balloon of claim 1, wherein the controller is configured to determine the predicted relative location of the correspondent balloon based on a Kalman filter method.

13. The balloon of claim 12, wherein the predicted relative location of the correspondent balloon is determined using a last known location of the correspondent balloon as an input to the Kalman filter method.

14. The balloon of claim 12, wherein the predicted relative location of the correspondent balloon is determined using a last known location and a last known motion vector of the correspondent balloon as inputs to the Kalman filter method.

15. The balloon of claim 1, wherein the controller is configured to determine the predicted relative location of the correspondent balloon based on a linear-quadratic estimation method.

16. The balloon of claim 1, further comprising a camera configured to acquire images of the correspondent balloon, wherein the controller is configured to determine the predicted relative location of the correspondent balloon based on the images.

17. The balloon of claim 1, further comprising a radio transceiver configured to acquire radio signals from the correspondent balloon, wherein the controller is configured to determine the predicted relative location of the correspondent balloon based on the radio signals.

18. The balloon of claim 1, further comprising a global positioning system configured to acquire global positioning system data, wherein the controller is configured to determine the predicted relative location of the correspondent balloon based on the global positioning system data.

19. The balloon of claim 1, further comprising an inertial guidance system configured to acquire inertial guidance system data, wherein the controller is configured to determine the predicted relative location of the correspondent balloon based on the inertial guidance system data.

20. A method, comprising:
  determining a location of a first balloon, wherein the first balloon comprises an optical-communication component having a pointing axis, wherein the optical communication component is configured to communicate with a second balloon via a free-space optical link, wherein the optical communication component comprises an optical receiver configured to receive free-space optical signals along the pointing axis, and wherein the optical receiver comprises a multiple element detector system configured to detect changes in an optical beam location;
  determining a predicted location of the second balloon relative to the location of the first balloon based on a last known location and a last known motion vector of the second balloon; and
  controlling a pointing mechanism to adjust the pointing axis of the optical-communication component in the first balloon based on the predicted location, to maintain the free-space optical link with the second balloon.

21. The method of claim 20, wherein determining the predicted location of the second balloon comprises using a Kalman filter method.

22. The method of claim 21, wherein determining the predicted location of the second balloon comprises using the last known location of the second balloon as an input to the Kalman filter method.

23. The method of claim 21, wherein determining the predicted location of the second balloon comprises using the last known location and the last known motion vector of the second balloon as inputs to the Kalman filter method.

24. The method of claim 20, wherein determining the predicted location of the second balloon comprises using a linear-quadratic estimation method.

25. The method of claim 20, wherein the optical-communication component further comprises an optical transmitter configured to transmit free-space optical signals along the pointing axis.

26. A non-transitory computer readable medium having stored therein instructions executable by a computing device to cause the computing device to perform functions comprising:
  determining a location of a first balloon, wherein the first balloon comprises an optical communication component having a pointing axis, wherein the optical communication component is configured to communicate with a second balloon via a free-space optical link, wherein the optical communication component comprises an optical receiver configured to receive free-space optical signals along the pointing axis, and wherein the optical receiver comprises a multiple element detector system configured to detect changes in an optical beam location;
  determining a predicted location of the second balloon relative to the location of the first balloon based on a last known location and a last known motion vector of the second balloon; and
  controlling a pointing mechanism to adjust the pointing axis of an optical-communication component in the first balloon based on the predicted location, to maintain the free-space optical link with the second balloon.

27. The non-transitory computer readable medium of claim 26, wherein determining the predicted location of the second balloon comprises using a Kalman filter method.

28. The non-transitory computer readable medium of claim 27, wherein determining the predicted location of the second balloon comprises using the last known location and the last known motion vector of the second balloon as inputs to the Kalman filter method.

29. The non-transitory computer readable medium of claim 26, wherein determining the predicted location of the second balloon comprises using a linear-quadratic estimation method.

* * * * *